(12) United States Patent
Kawakami et al.

(10) Patent No.: US 9,762,337 B2
(45) Date of Patent: Sep. 12, 2017

(54) COMMUNICATION APPARATUS AND COMPUTER READABLE MEDIUM FOR EXECUTING APPLICATION PROGRAMS BASED ON RADIO-WAVE INTENSITY

(71) Applicant: CASIO COMPUTER CO., LTD., Tokyo (JP)

(72) Inventors: Gou Kawakami, Fussa (JP); Yoichi Murayama, Fussa (JP); Toshihiko Yoshida, Fussa (JP); Kazuma Kawahara, Akishima (JP); Asami Aso, Kokubunji (JP); Takashi Kawashimo, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/187,977

(22) Filed: Jun. 21, 2016

(65) Prior Publication Data

US 2017/0078033 A1   Mar. 16, 2017

(30) Foreign Application Priority Data

Sep. 16, 2015   (JP) ................. 2015-182521

(51) Int. Cl.
| | |
|---|---|
| *H04B 17/00* | (2015.01) |
| *H04W 72/04* | (2009.01) |
| *H04W 48/04* | (2009.01) |
| *A63F 13/30* | (2014.01) |
| *H04B 17/318* | (2015.01) |
| *H04W 76/02* | (2009.01) |
| *H04W 4/00* | (2009.01) |
| *A63F 13/327* | (2014.01) |

(Continued)

(52) U.S. Cl.
CPC ....... *H04B 17/318* (2015.01); *A63F 13/2145* (2014.09); *A63F 13/235* (2014.09); *A63F 13/327* (2014.09); *A63F 13/48* (2014.09); *H04W 4/008* (2013.01); *H04W 76/02* (2013.01)

(58) Field of Classification Search
CPC ..... H04W 48/00; H04W 48/04; H04W 48/16; H04W 72/04; H04W 72/0486; A63F 13/20; A63F 13/2145; A63F 13/216; A63F 13/235; H04B 17/00; H04B 17/30; H04B 17/318
See application file for complete search history.

(56) References Cited

U.S. PATENT DOCUMENTS 9,226,224 B1 * 12/2015 Houri ................. H04W 48/16
2015/0199672 A1 * 7/2015 Woloshin ........... G06Q 20/3224
705/39

(Continued)

FOREIGN PATENT DOCUMENTS

JP   2001-095046 A   4/2001

*Primary Examiner* — Blane Jackson
(74) *Attorney, Agent, or Firm* — Scully, Scott, Murphy & Presser, P.C.

(57) ABSTRACT

According to one embodiment, a communication apparatus includes a Bluetooth (trademark) controller which is wirelessly connected to a mobile information terminal, and a CPU configured to acquire a radio-wave intensity of wireless connection to the wirelessly connected mobile information terminal, to selectively read an application program from a program memory, based on the acquired radio-wave intensity, and to execute the application program.

3 Claims, 6 Drawing Sheets

(51) Int. Cl.
*A63F 13/2145* (2014.01)
*A63F 13/48* (2014.01)
*A63F 13/235* (2014.01)

(56) References Cited

U.S. PATENT DOCUMENTS

2015/0269624 A1* 9/2015 Cheng .............. G06Q 30/0267
                                                     705/14.58
2015/0348146 A1* 12/2015 Shanmugam ...... G06Q 30/0603
                                                     705/71
2016/0050684 A1* 2/2016 Ni ..................... H04W 28/16
                                                     370/329

* cited by examiner

FIG.5

| | GAME A/DARTS GAME | GAME B/GUN SHOOTING GAME |
|---|---|---|
| DISTANCE ESTIMATED FROM RADIO-WAVE INTENSITY | LESS THAN 2.5 m | 2.5 m OR MORE |
| ELEMENTS TO BE DETECTED AT TIME OF GAME | · STRENGTH OF FLICK<br>· DIRECTION OF FLICK | · STRENGTH OF FLICK<br>· DIRECTION OF FLICK<br>· ATTITUDE OF SMARTPHONE BODY (ANGLE OF ATTACK AND INCLINATION IN RIGHT-AND-LEFT DIRECTION) |

COMMUNICATION APPARATUS AND COMPUTER READABLE MEDIUM FOR EXECUTING APPLICATION PROGRAMS BASED ON RADIO-WAVE INTENSITY

CROSS-REFERENCE TO RELATED APPLICATIONS

This application is based upon and claims the benefit of priority from prior Japanese Patent Application No. 2015-182521, filed Sep. 16, 2015, the entire contents of which are incorporated herein by reference.

BACKGROUND OF THE INVENTION

1. Field of the Invention

The present invention relates to a communication apparatus and a computer readable medium.

2. Description of the Related Art

There has been proposed a technique which aims at preventing, at a time of data distribution in a bad network condition, long-time distribution by limiting the reception of distributed data by a mobile terminal (for example, Jpn. Pat. Appln. KOKAI Publication No. 2001-095046 (patent document 1)).

In the technique disclosed in patent document 1, the reception intensity of radio waves is measured, and thereby it is determined whether the reception can be stabilized or not. Based on the determination result, a decision is made on whether or not to continue the reception operation.

In the meantime, in Bluetooth (trademark) which is a near-field wireless communication technique, the function of radio beacons is applied to some stores, and the cooperation between the smartphones of customers and the stores is realized. Thereby, the stores provide services which utilize this function for giving visit points to customers, for activating application programs for coupons, for settlement of payment, etc.

In the radio beacon function of Bluetooth™, it is assumed that a preset service is executed in the state in which the reception intensity of radio waves has increased to a predetermined level or above.

By detecting the reception intensity of radio waves as described above, a contribution is made to the stabilization of communication. On the other hand, techniques have been studied for more positively utilizing the detected reception intensity and reflecting the detected reception intensity on application programs.

BRIEF SUMMARY OF THE INVENTION

The present invention has been made in consideration of the above circumstances, and the object of the invention is to provide a communication apparatus and a computer readable medium, which can utilize the reception intensity of radio waves by wireless connection, and can reflect the reception intensity on application programs.

According to one embodiment of the present invention, there is provided a communication apparatus including a communication unit configured to acquire a radio-wave intensity of wireless connection to a wirelessly connected mobile information terminal; and a processor configured to execute an application program, based on the radio-wave intensity.

According to the invention, it is possible to utilize the reception intensity of radio waves by wireless connection, and reflect the reception intensity on application programs.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5 is a view illustrating switching conditions, etc. of a plurality of game application programs according to the embodiment.

DETAILED DESCRIPTION OF THE INVENTION

Hereinafter, with reference to the accompanying drawings, a description will be given of an embodiment in a case in which the present invention is applied to a game system including a signage device.

Figure 1:
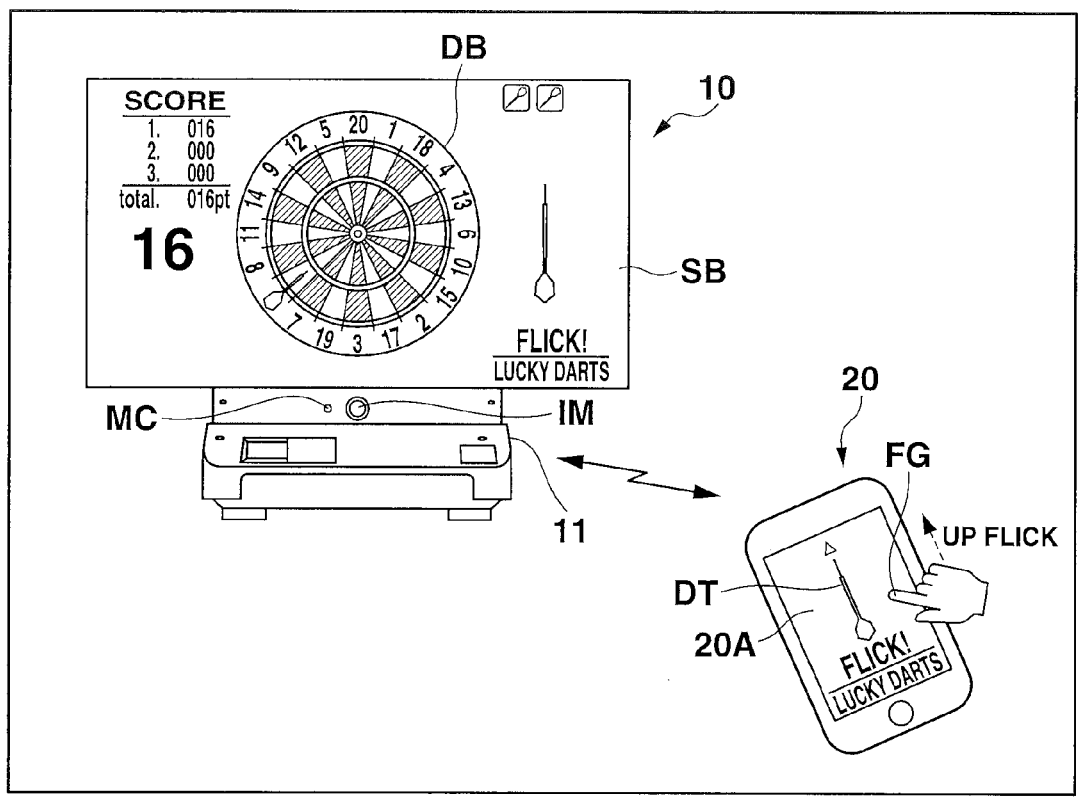
FIG. 1 is a view illustrating an environment of installation of a game system including a signage device according to an embodiment of the present invention.

FIG. 1 is a view illustrating an environment of installation of a game system according to the embodiment. In the state illustrated in FIG. 1, for example, a signage device 10 is disposed in a store, and an image of a dartboard DB and other images relating to a darts game are projected. On the other hand, with a smartphone 20 which a customer possesses, a dart DT for the darts game can be thrown by a flick operation in a pseudo-manner.

The signage device 10 is an electronic mannequin using a projector technique. A rectangular signage board SB (display), which is replaceable, is erectly provided on a front end side of the top surface of a device housing 11. An optical image that is emitted from a projection lens (not shown) of a rear projection method, which is provided on the top surface of the device housing 11, is projected from the rear surface side of the signage board SB. Thereby, the signage board SB displays an image.

On the device housing 11 under the signage board SB, there are provided an imaging portion IM of a wide-angle optical system for photographing an environment on the front side of the signage device 10, and a microphone portion MC.

On the other hand, the smartphone 20 is possessed by a customer who visits the store. An application program (hereinafter referred to as "application") for a game, which is used by the signage device 10, is installed in advance in the smartphone 20. Thereby, for example, in a darts game, as illustrated in FIG. 1, a dart can be thrown in a pseudo-manner by a flick operation on a display/touch-panel 20A.

The signage device 10 and smartphone 20 are wirelessly connected by, for example, a wireless LAN function according to the IEEE802.11a/b/g/n standard and a Bluetooth (trademark) technique that is a near-field wireless communication technique according to the IEEE802.15.1 standard.

Figure 2:
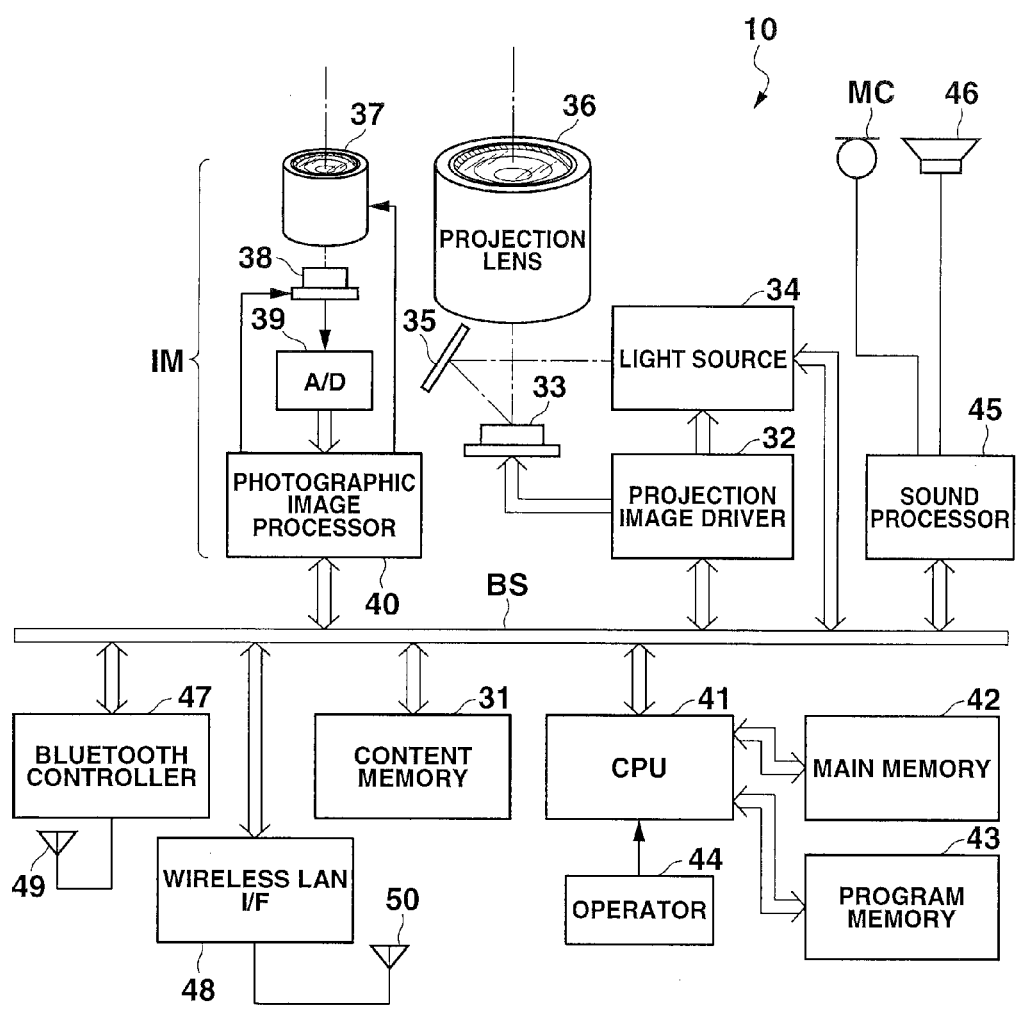
FIG. 2 is a block diagram for describing a functional configuration of, mainly, an electronic circuit of the signage device according to the embodiment.

Next, referring to FIG. 2, the functional configuration of, mainly, an electronic circuit of the signage device 10 is described.

Content data, which relate to various kinds of goods, a background for use in an application (to be described later), and parts to be synthesized, etc., are prestored in a content memory 31. The content data are composed of image data, sound data, etc. The image data in the content data is read out by a CPU 41 (to be described later), and is sent to a projection image driver 32 via a system bus BS.

The projection image driver 32 display-drives a micromirror element 33 which is a display element, by higher time-division drive obtained by multiplication of a frame rate following a predetermined format, for example, 120 [frames/second], a division number of a color component, and the number of display gradations, in accordance with the image data that was sent.

The micromirror element 33 displays and operates, by an individual high-speed ON/OFF operation, each inclination angle of a plurality of micromirrors corresponding to, for example, WXGA (lateral 1280 pixels×longitudinal 800 pixels) arranged in an array shape, thereby forming an optical image by reflection light.

On the other hand, a light source 34 cyclically emits R, G, B primary color lights in time division. The light source 34 includes an LED as a semiconductor light-emitting device and repeatedly emits R, G, B primary color lights in time division. The LED of the light source 34 may include an LD (semiconductor laser) and an organic EL element as the LED in a broad sense.

The primary color lights from the light source 34 are reflected by a mirror 35 and applied to the micromirror element 33. Then, the reflected light from the micromirror element 33 forms an optical image. The formed optical image passes through a projection lens 36 and is projected onto the back side of the signage board SB.

The imaging portion IM includes a wide-angle photographic lens portion 37 which faces in a frontal direction of the signage device 10, and a CMOS image sensor 38 which is a solid-state imaging device disposed at a focus position of the photographic lens portion 37.

An image signal obtained by the CMOS image sensor 38 is digitized by an A/D converter 39 and then sent to a photographic image processor 40

The photographic image processor 40 scans and drives the CMOS image sensor 38 for execution of a photographing operation to convert image data obtained by photographing into a data file, and, thus, to transmit the data file to a CPU 41 (to be described below).

The CPU 41 controls all operations of the above circuits. The CPU 41 is connected directly to a main memory 42 and a program memory 43. The main memory 42 is composed of an SRAM, for example, and functions as a work memory of the CPU 41. The program memory 43 is composed of an electrically rewritable nonvolatile memory, such as a flash ROM, and stores operation programs including applications to be executed by the CPU 41, various standardized data items, and the like.

The CPU 41 reads the operation program, standardized data, and the like stored in the program memory 43, develops and stores the read program, data, and the like in the main memory 42, and executes the program, thereby executing overall control on the signage device 10.

The CPU 41 carries out various projection operations according to an operation signal from an operator 44. The operator 44 accepts key operation signals of some operation keys including a power key, which are provided on the main body of the signage device 10, and sends a signal corresponding to an accepted operation to the CPU 41.

The CPU 41 is further connected to a sound processor 45, a Bluetooth (trademark) controller 47 and a wireless LAN interface (I/F) 48 through the system bus BS.

The sound processor 45 includes a sound source circuit of a PCM sound source or the like and converts sound data in content data, which is read from the content memory 31 during the projection operation, to analog data, and drives a speaker 46 to produce sound or generate a beep sound or the like if necessary.

In addition, the sound processor 45 digitizes an audio signal which is acquired by the microphone portion MC, and extracts a gender, etc. as attributes of a speaker by speech recognition (speech analysis).

The Bluetooth™ controller 47 is wirelessly connected to the smartphone 20 or the like, which exists within a short distance, via a Bluetooth™ antenna 49, and executes data transmission/reception. On the other hand, the Bluetooth™ controller 47 transmits a Bluetooth™ beacon signal and receives information corresponding to the reception intensity of radio waves from the smartphone 20 or the like.

The wireless LAN interface 48 is wirelessly connected to, for example, the smartphone 20 or the like through a wireless LAN antenna 50, and transmits and receives necessary data.

Figure 3:
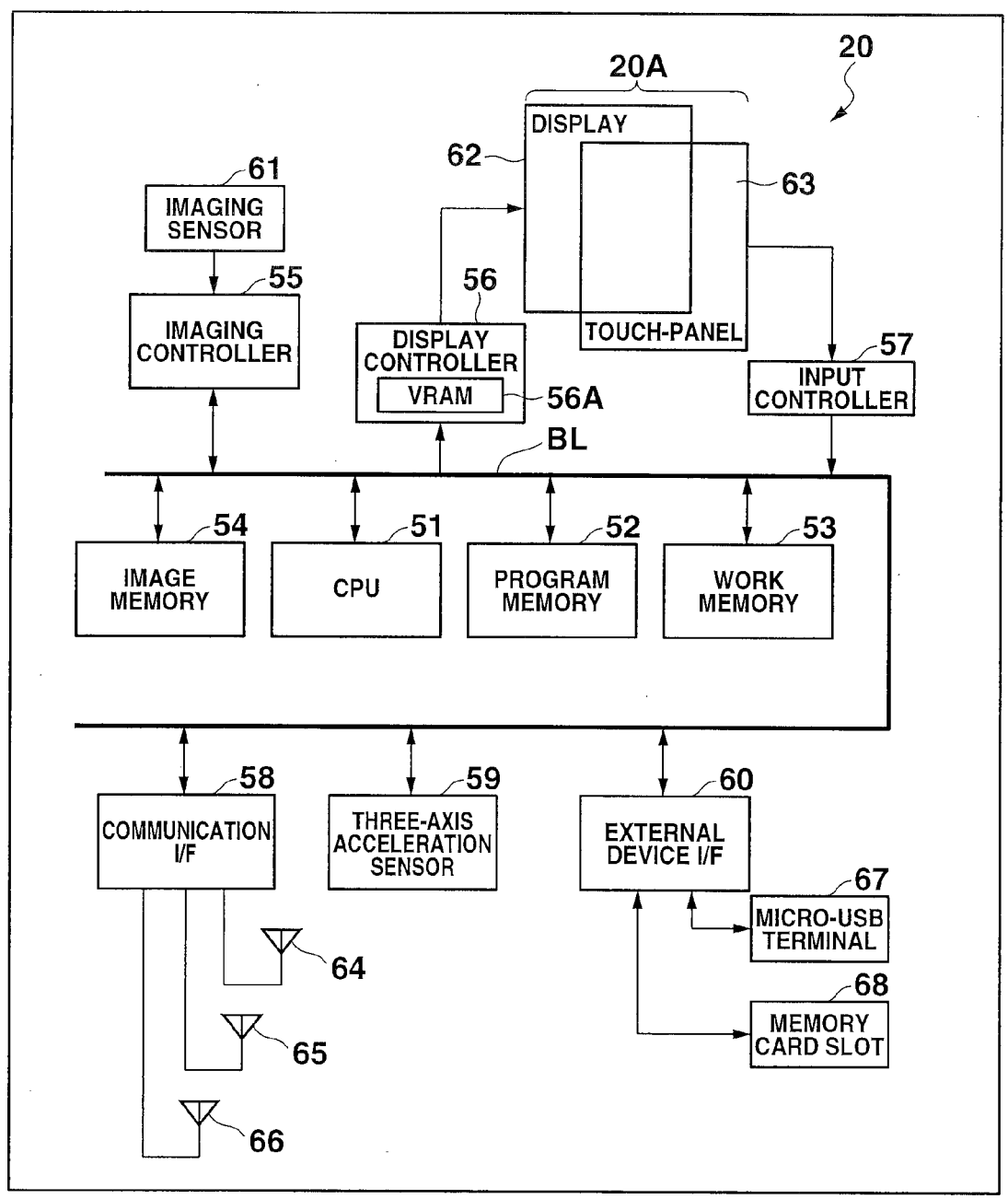
FIG. 3 is a block diagram for describing a functional configuration of an electronic circuit of a smartphone according to the embodiment.

Next, referring to FIG. 3, a description is given of a block diagram illustrating the functional configuration of an electronic circuit in the smartphone 20. In FIG. 3, numeral 51 denotes a CPU which executes an overall control operation of the smartphone 20. The CPU 51 is connected via a bus line BL to a program memory 52, a work memory 53, an image memory 54, an imaging processor 55, a display processor 56, an input processor 57, a communication interface (I/F) 58, a three-axis acceleration sensor 59, and an external device interface (I/F) 60.

The program memory 52 is composed of a nonvolatile memory, and stores an OS and application program, which enable the CPU 51 to operate, fixed data, etc.

The work memory 53 is composed of, for example, a DRAM, and functions as a main memory of the CPU 51.

The image memory 54 stores a plurality of image data or the like.

The imaging processor 55 controls a photographing operation in an imaging sensor 61 which is composed of a lens optical system and a solid-state imaging element such as a CMOS image sensor. The imaging processor 55 digitizes an image signal obtained by photography, creates a data file of the digitized data with data compression being involved, and stores the data file in the image memory 54.

The display processor 56 includes a VRAM 56A for storing image data that is to be displayed. The display processor 56 drives a display 62 which is a constituent of the above-described display/touch-panel 20A, and causes the display 62 to display an image, etc. The display 62 is composed of a backlight-equipped color liquid crystal panel, and a driving circuit of this color liquid crystal panel.

A touch-panel 63 using a transparent electrode film is formed integral with the display 62, thus constituting the display/touch-panel 20A. The input processor 57 digitizes a time-sequential coordinate signal, which the touch-panel 63 outputs in accordance with a user's touch operation, and sends the digitized signal as an operation signal to the CPU 51.

Using antennas 64, 65 and 66, the communication interface 58 executes wireless communications with networks (not shown), based on techniques of the Fourth-Generation mobile phone system, wireless LAN according to the IEEE802.11a/b/g/n standard and Bluetooth™ according to the IEEE802.15.1 standard.

The three-axis acceleration sensor 59 detects, as acceleration information, the attitude of the device housing of the smartphone 20 in the three-dimensional space.

The external device interface 60 is connectable or attachable to, for example, an external hard disk drive, a USB memory, or a memory card, via a micro-USB terminal 67 or a memory card slot 68.

Next, the operation of the embodiment is described.

Figure 4:
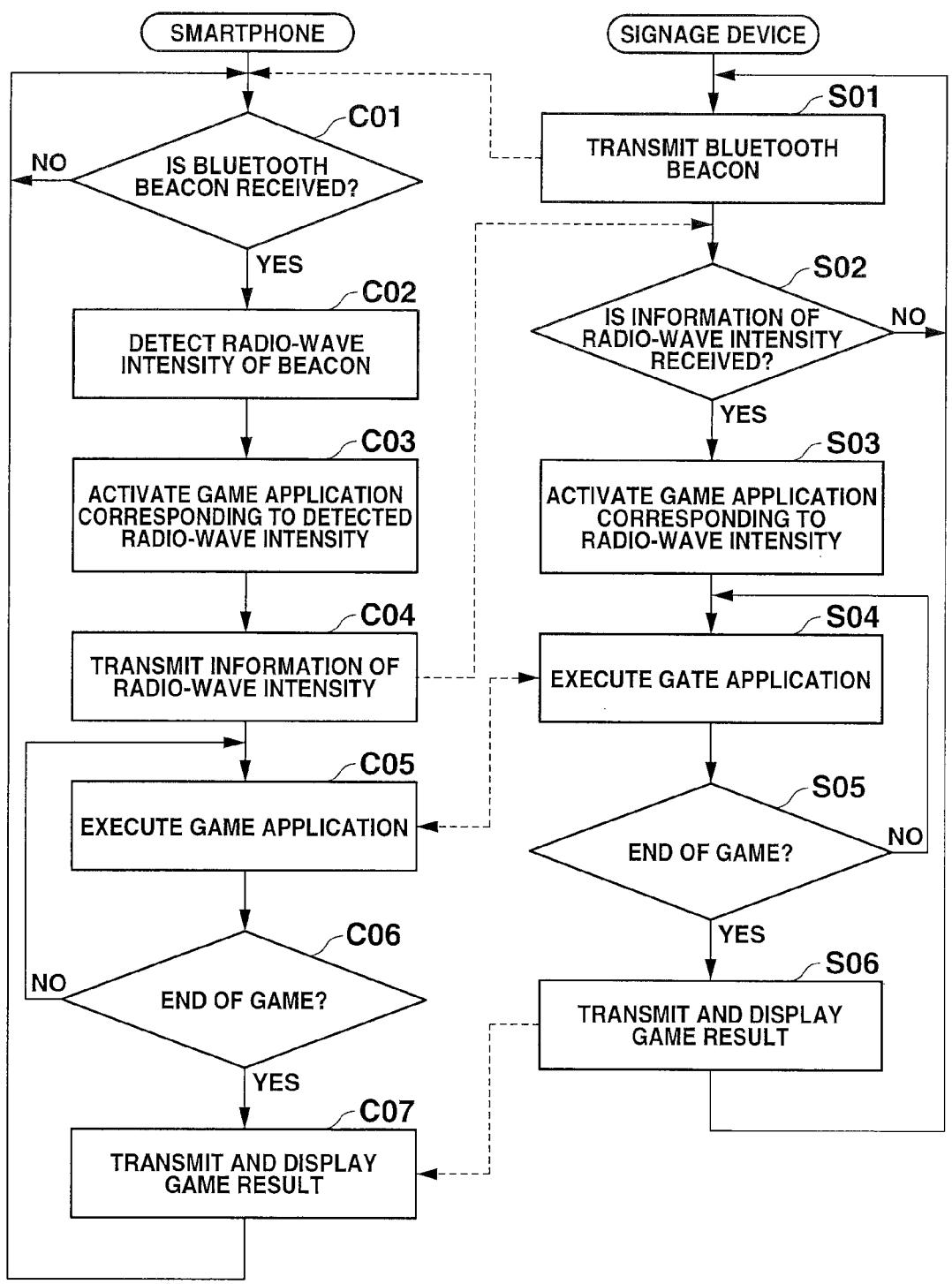
FIG. 4 is a sequence chart illustrating the flows of processes of the signage device and smartphone according to the embodiment at a time when a game application is executed.

FIG. 4 is a sequence chart illustrating the flows of processes of the smartphone 20 and signage device 10 at a time when the smartphone 20 functioning as a client device selects and executes an application in accordance with the degree of proximity to the signage device 10 functioning as a server device, in an environment in a store where the signage device 10 is installed.

It is assumed that a plurality of applications, which are to be executed between the signage device 10 and smartphone 20, are preinstalled in the signage device 10 and smartphone 20.

In the signage device 10, the CPU 41 always transmits, from the power-on state, a Bluetooth™ beacon signal of, e.g. class 2 (communication coverage distance: about 10 m) via the Bluetooth™ controller 47 and Bluetooth™ antenna 49 (step S01). The CPU 41 determines whether the smartphone 20 or the like is in close proximity or not, according to whether information of a radio-wave intensity responding to the beacon signal was received or not (step S02).

Here, if the information of the radio-wave intensity responding to the Bluetooth™ beacon signal is not received and it is determined that the smartphone 20 or the like is not in close proximity (No in step S02), the CPU 41 returns to the process from step S01 and repeatedly executes the process of steps S01 and S02, thus standing by for the smartphone 20 or the like coming in close proximity.

When a visiting customer who possesses the smartphone 20 has appeared in the vicinity of the signage device 10 as illustrated in FIG. 1, the CPU 51 in the smartphone 20 always detects, in the power-on state, reception of the Bluetooth™ beacon signal by the communication interface 58, and repeatedly determines whether the beacon signal has successfully been received or not (step C01). Thus, the CPU 51 stands by for the reception of the Bluetooth™ beacon signal from the signage device 10.

When the CPU 51 of the smartphone 20 has determined that the Bluetooth™ beacon signal was received (Yes in step C01), the CPU 51 then detects the radio-wave intensity of the received beacon signal (step C02).

Based on the information of the detected radio-wave intensity, the CPU 51 selects and activates a game application corresponding to the distance from the signage device 10 estimated from the radio-wave intensity, from among applications which are prepared in advance to be executed between the smartphone 20 and the signage device 10 (step C03).

FIG. 5 illustrates examples of game applications which are prepared in advance between the signage device 10 and smartphone 20. Here, it is assumed that two kinds of game applications, namely game A "darts game", which is illustrated in FIG. 1, and game B "gun shooting game", are prepared in advance.

As regards the distance from the signage device 10, which is estimated from the radio-wave intensity, for example, 2.5 m is set as a threshold. If the distance is less than 2.5 m, the game A is selected and executed. If the distance is 2.5 m or more, the game B is selected and executed.

Incidentally, it is assumed that in the game A "darts game", "intensity of flick" and "direction of flick" are set as operational elements which are detected at a time of the game.

In the game B "gun shooting game", on the other hand, "attitude of smartphone body" is set, in addition to the "intensity of flick" and "direction of flick", as operational elements which are detected at a time of the game.

The above-described FIG. 1 is a view illustrating the game environment by the signage device 10 and smartphone 20 while the game A "darts game" is being executed. In FIG. 1, the signage board SB of the signage device 10 includes the dartboard DB in a state in which a first-throw dart sticks, and projects a remaining third-throw dart DT and a score at a time point when the first dart was thrown.

In the smartphone 20, on the other hand, the display/touch-panel 20A displays a second-throw dart DT. A state is represented in which the dart DT is about to be thrown by an up flick operation of a finger FG of the user of the smartphone 20.

Figure 6:
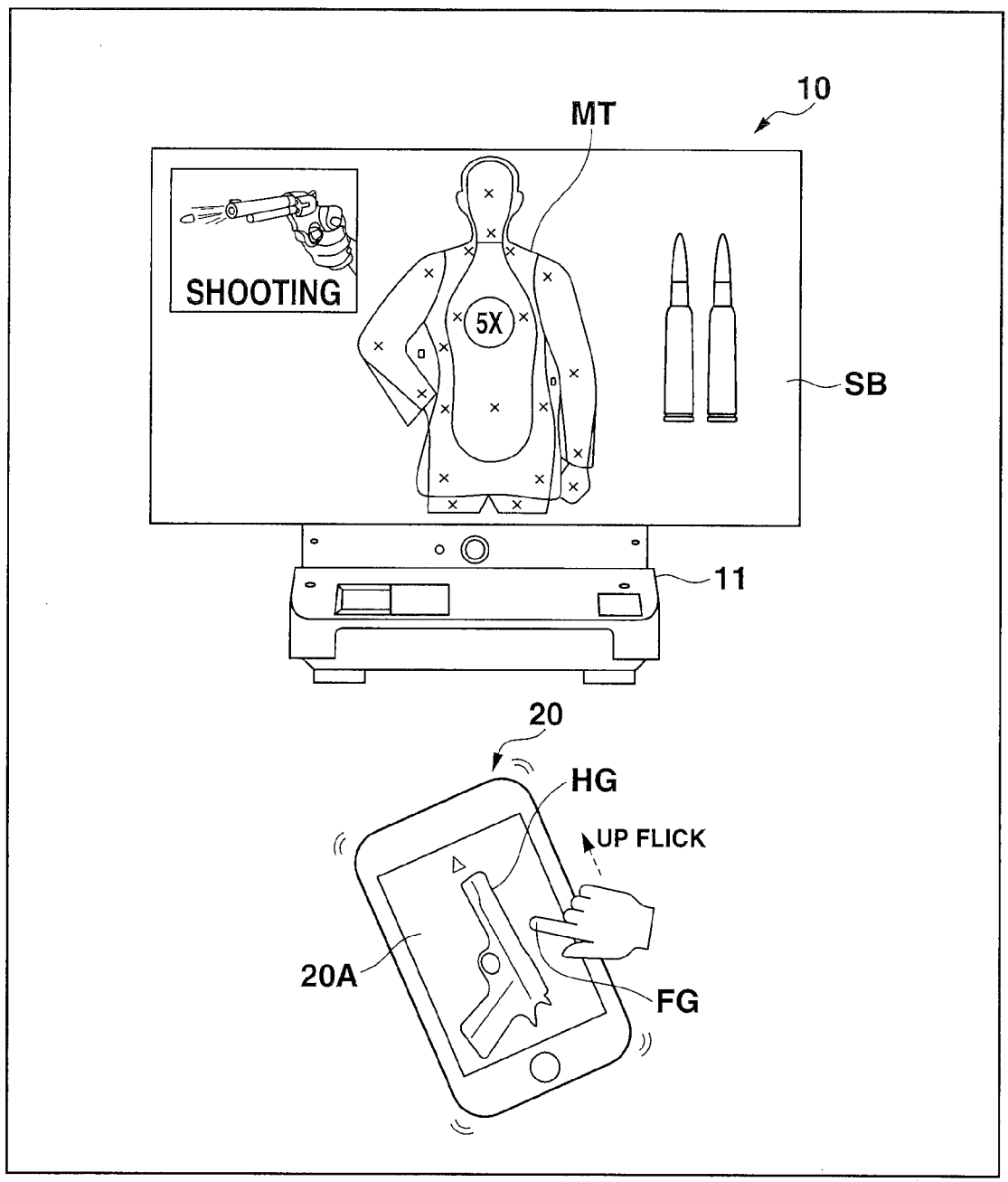
FIG. 6 is a view illustrating an environment of use of another game system according to the embodiment.

FIG. 6 is a view illustrating a game environment by the signage device 10 and smartphone 20 while the game B "gun shooting game", in place of the game A "darts game", is being executed.

In FIG. 6, the signage board SB of the signage device 10 includes a human image target MT, and projects images of remaining second and third bullets, etc.

In the smartphone 20, on the other hand, the display/touch-panel 20A displays a handgun HG. A state is represented in which a bullet by the handgun HG is about to be shot by an up flick operation of the finger FG of the user of the smartphone 20.

In this game, as described above, the attitude of the body of the smartphone 20 is also reflected on a shooting result, based on the detection output of the three-axis acceleration sensor 59. Thus, the direction of the barrel of the handgun HG displayed on the display/touch-panel 20A is set at a proper angle of attack, and the body of the body of the smartphone 20 is set with no inclination in the right-and-left direction. In this state, by performing a flick operation in an upward direction of the screen in parallel with the barrel, an exact shooting operation can be performed on the human image target MT projected on the signage board SB.

In this manner, the operational elements are varied depending on game applications, and the operation parameter corresponding to the operation amount with respect to the same operation element is also varied. Thereby, the degree of difficulty can be varied among game applications, and the properties of games can be enhanced.

In the above step C03, for example, when the distance from the signage device 10, which is estimated from the radio-wave intensity, is less than 2.5 m, the CPU 51 selects and activates the application of the game A "darts game".

Further, the CPU 51 transmits the information indicative of the detected radio-wave intensity by the communication interface 58, for example, by Bluetooth™ communication (step C04).

On the side of the signage device 10 that is the server device, at a time point when the information indicative of the radio-wave intensity sent from the smartphone 20 that is the client device was received, it is determined in step S02 that the smartphone 20 or the like has come in close proximity (Yes in step S02). Based on the received information indicative of the radio-wave intensity, a game application corresponding to the distance estimated from the radio-wave intensity is selected from among the applications which are prepared in advance to be executed between the smartphone 20 and the signage device 10, and the selected application is activated (step S03).

Thereafter, in the signage device 10, while the signage device 10 is communicating with the smartphone 20 or the like where necessary, the CPU 41 of the signage device 10 executes, as needed, the game application selected at that time point (step S04), and determines whether this game was finished or not (step S05).

If the game is not finished, the CPU 41 goes back to the process of step S04. Subsequently, while repeatedly executing the process of step S04 and S05, the CPU 41 stands by until determining the end of the game.

In the smartphone 20, on the other hand, after transmitting the information indicative of the radio-wave intensity in step C04, the smartphone 20 communicates with the signage device 10 where necessary. While executing executes, as needed, the selected game application (step C05), the CPU 51 determines whether this game was finished or not (step C06).

If the game is not finished, the CPU 51 goes back to the process of step C05. Subsequently, while repeatedly executing the process of step C05 and C06, the CPU 51 stands by until determining the end of the game.

In the game environment illustrated in FIG. 1 or FIG. 6, if the operation on the smartphone 20 side and the process in the signage device 10 have progressed and the game has been finished, the signage device 10 that is the server device determines the end of the game in step S05 (Yes in step S05). Then, the result of the game is calculated, and the content of the calculated result is transmitted to the smartphone 20 and is also projected on the signage board SB. Thus, the series of processes is finished, and the process returns to step S01 to start a similar operation once again.

On the side of the smartphone 20 that is the client device, the end of the game is determined in step C06 (Yes in step C06), and the result of the game, which is set from the signage device 10, is received and displayed on the display/touch-panel 20A (step C07). Thus, the series of processes is finished, and the process returns to step C01 to start a similar operation once again.

As has been described above in detail, according to the present embodiment, the radio-wave intensity by wireless connection can be positively utilized, and reflected on a variety of application programs.

In addition, in this embodiment, different degrees of difficulty are set for a plurality of game application programs, and an application program is selected and switched based on the degree of difficulty corresponding to the radio-wave intensity. Thus, by executing the game application program of a proper degree of difficulty, based on the distance between the signage device 10 and smartphone 20 which is derived from the radio-wave intensity, an operation with high diversity and high properties of games can be realized.

Moreover, in this embodiment, the description has been given of the system configuration in which one signage device 10 that is the server device and one smartphone 20 that is the client device are wirelessly connected. However, the present invention is not limited to this system configuration. It is possible to adopt a system configuration in which a plurality of mobile information terminals (smartphones 20) are simultaneously wirelessly connected as client devices, and application programs may be executed therebetween.

In this case, if a mean value of radio-wave intensities between the server device and plural client devices is calculated or a mean value of distances estimated from the radio-wave intensities is calculated, and the application program is switched based on the calculated means value, an application program which is suited to the positional relationship of the plural client devices can be selected.

In the meantime, in the above-described embodiment, the case was described in which the invention is applied to such a game system that the signage device 10 installed in a store or the like is wirelessly connected to the smartphone 20. However, the present invention does not restrict the devices which function as the server device and client device. The invention is similarly applicable to other devices if such devices incorporate computers which can execute, in a wirelessly connected state, a plurality of programs which are preinstalled.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication apparatus comprising:
   a memory configured to store a plurality of application programs,
   wherein each of the plurality of application programs is a game executed through user interaction, and
   wherein the each of the plurality of application programs is stored in association with a different level of user interactional difficulty, and each of the different levels of user interactional difficulty corresponds to a different predetermined radio-wave intensity; and
   a processor comprising hardware, wherein the processor is configured to:
   receive an acquired radio-wave intensity of a wireless connection between the communication apparatus and a mobile information terminal;
   determine one of the predetermined radio-wave intensity as corresponding to the acquired radio-wave intensity; and
   execute one of the plurality of application programs stored in association with one of the different levels of user interactional difficulty, the one of the different levels of user interactional difficulty corresponding to the one of the predetermined radio-wave intensity determined.

2. The communication apparatus of claim 1,
   wherein the communication apparatus is simultaneously wirelessly connected to a plurality of the mobile information terminal, and
   wherein the processor is configured to:

receive an acquired radio-wave intensity of a wireless connection between the communication apparatus and each of the plurality of the mobile information terminals; and obtain a mean value of the acquired radio-wave intensities.

3. A computer readable nontransitory medium which stores a program for causing a processor comprising hardware, which a communication apparatus wirelessly connected to a mobile information terminal incorporates, to:

access a memory configured to store a plurality of application programs,
wherein each of the plurality of application programs is a game executed through user interaction, and
wherein the each of the plurality of application programs is stored in association with a different level of user interactional difficulty, and each of the different levels of user interactional difficulty corresponds to a different predetermined radio-wave intensity; and receive an acquired radio-wave intensity of a wireless connection between the communication apparatus and a mobile information terminal;

determine one of the predetermined radio-wave intensity as corresponding to the acquired radio-wave intensity; and execute one of the plurality of application programs stored in association with one of the different levels of user interactional difficulty, the one of the different levels of user interactional difficulty corresponding to the one of the predetermined radio-wave intensity determined.

* * * * *